March 14, 1961  C. WENK  2,974,563
SPECTACLE FRAME
Filed Sept. 9, 1957
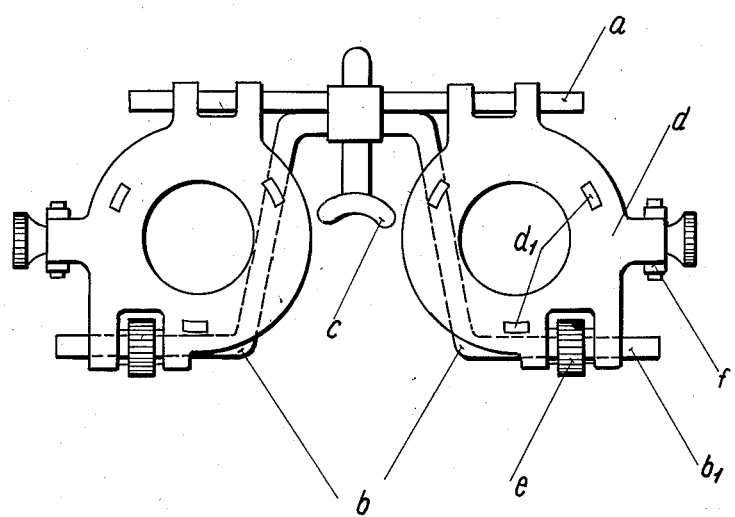
INVENTOR.
Cyril Wenk
BY Michael A. Striker
ATTORNEY United States Patent Office 2,974,563
Patented Mar. 14, 1961

2,974,563

SPECTACLE FRAME

Cyril Wenk, 2 Estonska, Prague 13, Czechoslovakia

Filed Sept. 9, 1957, Ser. No. 682,972

Claims priority, application Czechoslovakia Sept. 13, 1956

5 Claims. (Cl. 88—20)

The present invention relates to a spectacle frame as used when investigating persons with inferior sight for determining the type of eye glasses that are required. Into such frames interchangeable optical lenses are inserted to find the proper lense, which are required by the respective person.

It is an object of this invention to provide a frame of this kind which would be sufficiently rigid, of a reasonable weight, allow the proper adjustment of the ophthalmic axis, allow an easy exchange of eye glasses and would cause no inconvenience to the investigated person.

The object of this invention is shown by way of example on the accompanying drawing in front view.

The frame as shown consists of two bars $a$ and $b$, the upper bar $a$ being substantially straight, the lower bent to the shape on an inverted letter U with horizontally extended legs. The centers of both bars $a$ and $b$ are brought together and firmly connected, forming thus the central part of the frame, from which on each side a pair of parallel guiding bars extends. Each pair of said guiding bars supports an eye glass holder provided with eyelets, into which eyelets said guiding bars engage. The lower guiding bar $b_1$ is threaded and bears a nut $e$ by means of which the relative position of each eye glass holder $d$ with respect to the central part of the frame may be adjusted. Each eye glass holder is provided with temples $f$, joined to said holders in the customary way, engaging behind the ears of the investigated person and holding means $d_1$ to hold the eye glass lenses in the trail frame.

The central part is furthermore provided with an adjustable support $c$ to engage with the nose of the investigated person.

When investigating the sight of the person, the frame, roughly adjusted to the size of the head of the person, is put in position, the nose support readjusted and the eye glass holders adjusted so as to coincide with the ophthalmic axis of the eyes of the investigated person. This adjustment is effected by the nuts $e$ on the lower guiding bars. Different eye glasses are thereafter inserted into the eye glass holders $d$, until the correct size is ascertained.

It is obvious to those skilled in the art, that instead of two bars $a$, $b$ connected at their central parts, a single piece may be used, from the central part of which the said four guiding bars extend. Alternatively this item may be composed of more parts. The material from which these parts are made may be for instance metal or some suitable artificial material, bearing in mind that the required rigidity is maintained and that the weight is kept at a reasonable value.

The arrangement according to this invention has substantial advantages over hitherto used frames for this purpose which generally are provided with a single upper bar to which the eye glass supports are fastened. The use of two parallel guiding bars allows a better alignment of the eye glasses, prevents torsional stress of the upper supporting bar, allows the adjustment of the ophthalmic axis by an adjusting element below the eye of the person, which is much more convenient than an adjustment above the eye. Furthermore, the exchange of the eye glasses may be achieved in a more convenient way than with the present frames. Such a frame is generally more rigid and of less weight than presently used frames.

What I claim is:

1. A trial frame for fitting lenses, comprising, in combination, an upper guide member including a guide bar; means for supporting said upper guide member above the optical axis of the eyes of a patient to be fitted with lenses; a lower guide member having two straight guide bar portions located below said upper guide member and extending below the optical axis of the eyes of the patient, and a holding means extending between the inner ends of said guide bar portions and a central region of the upper guide member and being connected to the latter so as to leave the outer ends of said guide bar portions and said guide bar free and unengaged; a pair of lens holders located between said guide members and having each an upper edge portion and a lower edge portion and at least one bearing bore formed on each of said edge portions for slidably receiving said guide bar of said upper guide member and said bar portions of said lower guide member, respectively, so as to be slidably supported on the same; adjusting means connected to said lens holders and to one of said guide members and being operable for moving said lens holders along said upper and lower guide members; and a temple connected to each of said lens holders for movement therewith along said guide members.

2. A trial frame for fitting lenses, comprising, in combination, an upper guide member including a guide bar; means for supporting said upper guide member above the eyes of a patient to be fitted with lenses; a lower guide member having two straight bar guide end portions located below said upper guide member and extending below the optical axis of the eyes of the patient, and U-shaped holding means extending between the inner ends of said guide bar portions and a central region of the upper guide member and being connected to the latter so as to leave the outer ends of said guide bar portions and said guide bar free and unengaged; a pair of lens holders located between said guide members and having each an upper edge portion and a lower edge portion and at least one bearing bore formed on each of said edge portions for slidably receiving said guide bar of said upper guide member and said bar portions of said lower guide member, respectively, so as to be slidably supported on the same; a pair of adjusting means each adjusting means being connected to one of said lens holders and to one of said guide members and being operable independently of the other adjusting means for moving each of said lens holders independently of the other lens holder along said upper and lower guide members; and a temple connected to each of said lens holders for movement therewith along said guide members.

3. A trial frame for fitting lenses, comprising, in combination, an upper guide member including a guide bar; means for supporting said upper guide member above the eyes of a patient to be fitted with lenses; a lower guide member having two straight guide bar portions located below said upper guide member and extending below the optical axis of the eyes of the patient, and a holding means extending between the inner ends of said guide bar portions and a central region of the upper guide member and being connected to the latter so as to leave the outer ends of said guide bar portions and said guide bar free and unengaged; a pair of lens holders located between said guide members and having each an upper edge portion and a lower edge portion and at least one bearing bore formed on each of said edge portions for slidably receiving said guide bar of said upper guide member and said bar portions of said lower guide member, respectively, so as to be slidably supported on the same; a pair of adjusting means each adjusting means being connected to one of said lens holders and to one of said guide members and being operable independently of the other adjusting means for moving each of said lens holders independently of the other lens holder along said upper and lower guide members; and a temple connected to each of said lens holders for movement therewith along said guide members.

4. A trial frame for fitting lenses, comprising, in combination, an upper guide member including a guide bar; means for supporting said upper guide member above the eyes of a patient to be fitted with lenses; a lower guide member having two straight guide bar portions located below said upper guide member and extending below the optical axis of the eyes of the patient, and a holding means connected to said upper guide member, said guide bar portions having threads formed thereon; a pair of lens holders located between said guide members and having bearing bores slidably receiving said upper guide bar and said bar portions, respectively, so as to be slidably supported on the same; and an internally threaded adjusting screw, threaded over the threads of each of said guide bar portions and connected to one of said lens holders for moving one of said lens holders independently of the other lens holder along said upper and lower guide members.

5. A trial frame for fitting lenses, comprising, in combination, an upper guide member including a guide bar; means for supporting said upper guide member above the eyes of a patient to be fitted with lenses; a lower guide member having two straight guide end bar portions located below said upper guide member and extending below the optical axis of the eyes of the patient, and a holding means between said guide members connected to said upper guide member; a pair of lens holders located between said guide members, each having an upper edge portion and a lower edge portion, and two spaced bearing bores formed on each of said portions for slidably receiving said upper guide bar and said bar portions of said lower guide member, respectively, so as to be slidably supported on the same; one temple mounted on each of said lense holders for turning movement thereon; and a pair of adjusting means each adjusting means being connected to one of said lens holders and to the lower guide members and being operable independently of the other adjusting means for moving each of said lens holders independently of the other lens holder along said upper and lower guide members.

References Cited in the file of this patent

UNITED STATES PATENTS

| | | |
|---|---|---|
| 635,443 | Meyrowitz | Oct. 24, 1899 |
| 1,481,007 | Herold et al. | Jan. 15, 1924 |
| 2,835,161 | Williams | May 20, 1958 |

FOREIGN PATENTS

| | | |
|---|---|---|
| 18,802 | Great Britain | of 1907 |
| 16,671 | Germany | Mar. 13, 1882 |